United States Patent [19]

Miyauchi et al.

[11] Patent Number: 4,702,939
[45] Date of Patent: Oct. 27, 1987

[54] SELF-LOCKING AGENT AND SELF-LOCKING SCREW MATERIAL

[75] Inventors: Yukio Miyauchi; Yuichi Nakagawa; Makoto Kurihara; Norifumi Hayashi, all of Hachioji, Japan

[73] Assignee: Three Bond Co., Ltd., Tokyo, Japan

[21] Appl. No.: 814,394

[22] Filed: Dec. 30, 1985

[30] Foreign Application Priority Data

Jan. 17, 1985 [JP] Japan .................................. 60-5005

[51] Int. Cl.⁴ .......................... B05D 3/02; B32B 9/04; B32B 15/08; F16B 39/02
[52] U.S. Cl. .................................. 427/195; 411/258; 427/318; 428/418; 428/447; 428/458; 428/460; 525/423
[58] Field of Search ................ 411/258; 427/445, 195, 427/318; 428/418, 447, 458, 460; 525/423

[56] References Cited

U.S. PATENT DOCUMENTS

| | | |
|---|---|---|
| 3,893,496 | 7/1975 | Wallace et al. ...................... 411/258 |
| 4,285,378 | 8/1981 | Wallace .............................. 411/258 |
| 4,545,712 | 10/1985 | Wallace .............................. 411/258 |

FOREIGN PATENT DOCUMENTS

| | | |
|---|---|---|
| 887921 | 1/1962 | United Kingdom . |
| 1178497 | 1/1970 | United Kingdom . |
| 1448152 | 9/1976 | United Kingdom . |
| 2019252 | 10/1979 | United Kingdom . |

Primary Examiner—Michael R. Lusignan
Attorney, Agent, or Firm—Henry C. Nields

[57] ABSTRACT

This invention relates to a self-locking agent consisting essentially of a mixture of a polyamide or a copolyamide and an epoxy resin and a phenol resin, isocyanate compound, titanate, silane coupling agent or an organo-silicon compound and methods of making and using said agent.

14 Claims, 9 Drawing Figures

SELF-LOCKING AGENT AND SELF-LOCKING SCREW MATERIAL

DETAILED DESCRIPTION OF THE INVENTION

Technical Field of the Invention

This invention relates to a self-locking agent which gives the screw material the capability of adjustment and sealing by being attached to the screw surface. It also relates to the self-locking screw material which is produced by using the self-locking agent.

BACKGROUND OF THE INVENTION

Up until now it has been a wide practice as a prevention measure against looseness of a tightened screw to cover or melt a moldable material for bonding to the surface of the screw. This was economic and made the connection solid.

Examples of these measures are given below.

(1) Holes are mechanically punched in the surface of the screws and a thermoplastic resin which is used to fill up the holes.

(2) A small bit of the thermoplastic resin is pushed over the surface of the screw and a bonding portion of the thermoplastic resin is formed around the screw surface.

(3) The screw surface is heated and a thermoplastic resin powder is sprayed on the screw surface.

(4) The screw surface is chemically or mechanically treated beforehand and then a thermoplastic resin is melted onto the rough screw surface for bonding.

In all of these examples, excluding the case where the primer, mechanical, and chemical processing is completed, or in other words, the primary processing is completed before the secondary treatment of the thermoplastic resin, there are problems in the ability to stick.

Also there are problems in the processing which is required to perform the primary processing. In the aforementioned methods, the effect of the primer processing is efficient and desirable. However, because the comparatively expensive primer material must be spread over the entire screw surface it is a waste of time and material.

Moreover, there is the fear that when the primer is spread on the entire screw surface, there will be leakage in layer between the primer and the thermoplastic resin which will destroy the seal.

OBJECT OF THE INVENTION

A first objective of this invention is to obtain a self-locking agent which is capable of equal or superior adhesive strength than that obtained when using a primer process so that it is no longer necessary to perform the primer processing on the screw.

A second objective of this invention is to provide a self-locking screw material that creates a firm bond between the screw surface and the self-locking agent.

SUMMARY OF THE INVENTION

In accomplishing the foregoing objects the invention provides a self-locking agent which is a mixture of a first material to accomplish the self-locking function on the screw surface and a second material which causes the first material to adhere to the screw surface.

Also this invention provides a powdered self-locking agent comprising a first material of polyamide or copolyamide and a second material which causes the first material to adhere to the screw surface are combined and mixed in a volatile solvent and dispersed therein. After the solution is dried it is crushed into a powder. In addition, a self-locking screw material is made using the powdered self-locking agent which is heated and melted then spread on at least one portion of the aforementioned screw surface for bonding.

Further, powdered nylon and the adhesive are mixed. The adhesive is used as a coating of the powdered nylonsurface, producing a powdered self-locking agent. This powdered self-locking agent is spread on at least one portion of the screw surface and is welded, in other words, heated and melted for bonding. This makes up the self-locking screw material.

BRIEF DESCRIPTON OF THE DRAWINGS

DETAILED DESCRIPTION OF THE EMBODIMENTS

Figure 1:
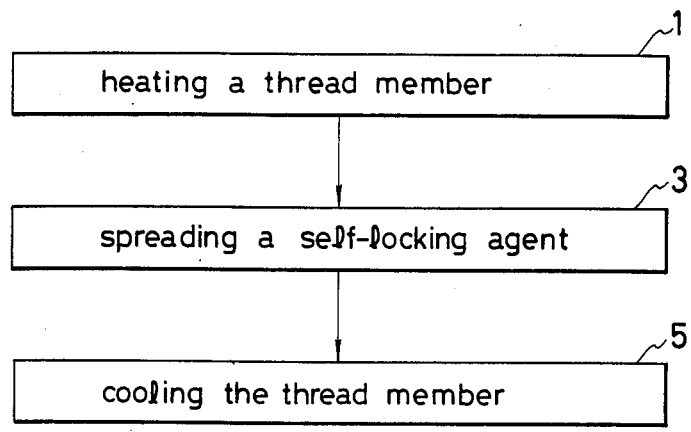
FIG. 1 and FIG. 2 are block diagrams showing the formation of the self-locking material.

Below are examples of the application of this invention. Two separate methods of mixing are given.

I. An Example of Dispersing and Mixing of the First and Second Material in the Solvent.

In this examples, the first material of polyamide or copolyamide and the second material which provides the first material with affinity to the screw surface are dissolved and mixed in a volatile solvent.

The first material which is the main ingredient of the self-locking agent consists of for example; nylon 6, nylon 6/6, nylon 6/10, nylon 8, nylon 11, nylon 12 or a copolymer of these materials.

One thing that must be considered in selecting the proper type of nylon is whether the melting point is comparatively lower than the dissolving temperature, and if it is easily manufactured without requiring difficult heat control. Also during melting and spreading is the viscosity right so as not to have much change in shape, and does it stick well to the screw. Also the water absorption rate should be small and have a high resistance to scratches. It should have flexibility and superior impact durability. Its hardness and strength should be high and also have good elasticity. It should be resistant to chemicals and have a small coefficient of friction so as to resist wear. Nylon 11 or nylon 12 or a copolymer can be used however they are not the only possibilities.

The diameter of the particles of the powdered nylon should be 10 to 500 um, with the most desired being 30 to 300 um.

Along with using nylon with the above characteristics the second material which can be efficiently used in the self-locking agent should be:

(A) Epoxy resin and phenol resin composition.
(B) An organic composition comprising epoxy resin and organic silicone compound having amino base, epoxy base or oxirane base.
(C) A composition consisting of the composition of item (B) with an amino resin added.
(D) Epoxy resin and titanate composition. These compositions are effective, especially items (B) and (C).

The epoxy resin used in the composition of the second material is a bisphenol type A epoxy resin with an average molecular weight of 800 or more. For example, Epicote 1004, 1007, 1009 produced by Shell Company are very good. Epicote 1007 with an average molecular weight of 2900 is the best.

The phenol resin used in combination with the epoxy resin may desirably be phenol resin or cresol modified phenol resin. The ratio of this combination should be, by weight, 1 part epoxy resin to 0.5 to 2.0 parts phenol resin.

The organic-silicone-compound with an amino base which is added to the epoxy resin is an organic-silicon-compound which contains an amino base, for example; $\gamma$-aminopropyltriethoxysilane, $N+\beta$ aminoethyl+$\gamma$ aminopropyltrimethoxysilane, $\gamma$- aminopropyltrimethoxysilane, etc. Also an organic-silicone-compound which contains an epoxy or oxirane base can be used, for example; $\gamma$-glycidoxypropyltrimethoxysilane, $\gamma+\beta$- methylglycidozy+ propyltrimethoxysilane.

The ratio of the organic-silicone-compound to the epoxy resin to which it is added should be, by weight, 1 part organic-silicone-compound to 2 to 50 parts epoxy resin. Furthermore, 1 part organic-silicone-compound to 5 to 20 parts epoxy resin is desired.

Examples of the volatile solvent to be used in the self-locking agent are; benzene, toluene, xylene resin, etc. which are aromatic solvents, 1.2.4. trichloroethylene, 1.1.1. trichloroethane, etc. which are chlorine solvents, and acetone, methyl-ethyl-ketone, etc. which are ketone solvents. These may be used as the solvent for dissolving the first and second materials. It is desired to use a solvent that will dissolve the second material but does not have to be one of the above.

The self-locking agent is made by dispersing the first and second material in a volatile solvent. This self-locking adhesive is then spread on the surface of the screw, and at the same time as drying the solvent or after the solvent is dried, if heat is applied, the surface processed by the second material is formed just as if a primer process was used. The first material made of nylon is then firmly fixed to the screw surface.

In FIGS. 3 to 6 are examples of the bolt used as the screw material, and shows an example of the self-locking screw material.

Figure 3:
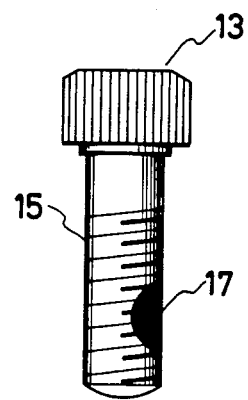
FIG. 3 is a side view showing the elliptical shape of the self-locking agent on the threads of a hexagon socket head bolt.
Figure 4:
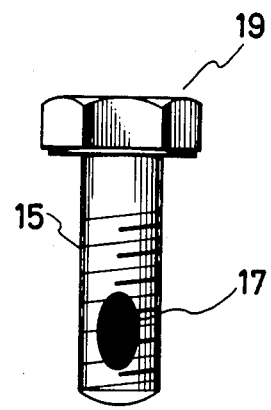
FIG. 4 is a front view showing the elliptical shape of the self-locking agent on the threads of a hexagon socket head bolt.
Figure 5:
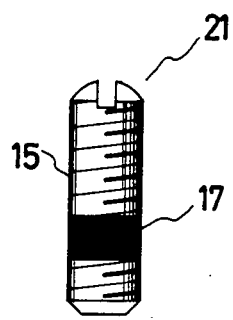
FIG. 5 is a front view showing the circumferential shape of the self-locking agent on the threads of a setscrew.
Figure 6:
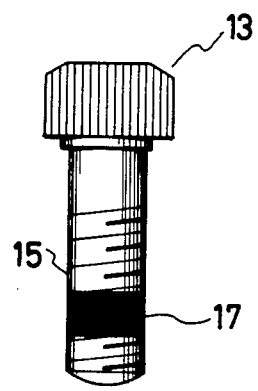
FIG. 6 is a side view showing the circumferential shape of the self-locking agent on the threads of a hexagon socket head bolt.

FIG. 3 shows how the self-locking agent 17 is spread in an elliptical shape on the thread portion 15 of hexagon socket head bolt 13. FIG. 4 shows how the same self-locking agent 17 is spread on bolt 19. FIG. 5 shows how self-locking agent 17 is spread over the complete thread portion 15 of setscrew 21. FIG. 6 shows how the self-locking agent compound is applied to hexagon socket head bolt 13 in the same manner as shown in FIG. 5.

As a pre-processing operation, a degreasing operation using trichloroethylene etc. should be sufficient. The bolt material may be of iron, copper, brass, stainless steel, or other and may be plated with chrome, zinc, chromate, nickel, etc.

Figure 7:
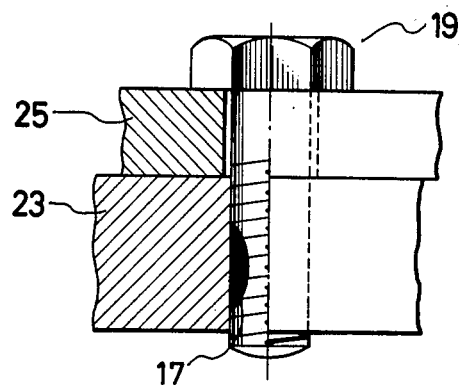
FIG. 7 is partial sectional view and side view showing the self-locking condition.
Figure 8:
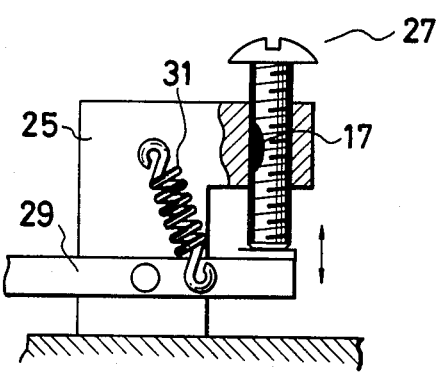
FIG. 8 is a partial sectional view and side view showing the adjustment of a fixing vise.
Figure 9:
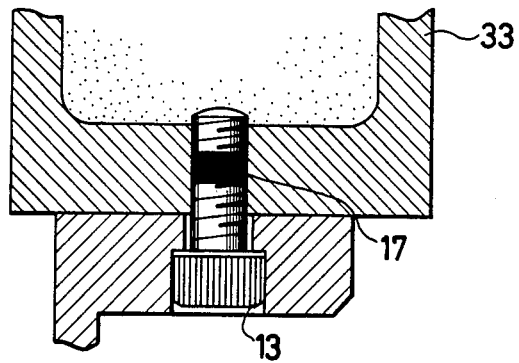
FIG. 9 is a sectional view showing the sealing of a liquid.

As shown in FIGS. 3 to 6, after the prescribed self-locking agent is applied to the screw material, during the drying period or after drying is completed, heat is applied. FIG. 7 shows an example of the self-locking function. It shows the condition of bolt 19 with the self-locking agent applied as it is screwed into the female threads of base material 23 to fix plate 25. The screw is firmly self-locked by self-locking agent 17. FIG. 8 shows setscrew 27 as it is screwed into the female threads of the base material 25. The end of the screw is used to adjust the position of lever 29 by way of the force exerted by spring 31. FIG. 9 shows an example of the sealing effect of the adhesive. Hexagon socket head bolt 13 which has self-locking agent 17 applied around the entire threads is screwed into the bottom surface of container 33 (for example an oil container) and is used to seal up the liquid (oil). The contents of the container does not have to be a liquid, but may be any fluid such as air etc. Also as can be understood from FIG. 9, the self-locking agent could be used in the place of sealing tape, for example in the screw of a water faucet.

(EXAMPLE 1)

In the methyl-ethyl-ketone solvent, 100 parts nylon 11 as first ingredients, 5 parts epoxy resin, and 3 parts isocyanate were dispersed. After it had been used to fill up the gap between the metallic surfaces and had dried, heat of 220° C. was applied for 30 minutes for welding. And the shearing adhesive force is tested. The results showed that the average shearing adhesive force when only the nylon ingredient was dispersed to be 217 kg/cm but the average adhesive force of this experiment was found to be 341 kg/cm.

(EXAMPLE 2)

After an M8×JIS 2 class bolt with chrome plating had been treated with trichloroethylene, a composition of, weight, 100 parts nylon-11, 5 parts Shell Epicote 1007, and 3 parts isocyanate AP staple was dispersed in the solvent and applied to the screw surface. After blow drying, heat of 220° C. was applied for 30 minutes and the adhesive was deposited to the screw surface.

The aforementioned screw is then screwed into the nut and the torque is measured during the screwing in and unscrewing of the screw. The average measured torque values for times 1 to 5 during screwing in of the screw were found to be 55, 40, 30, 25, 20 (kg. cm). The values found during unscrewing of the screw were found to be 50, 37, 28, 22, 18. It was possible to use the screw repeatedly 5 times meeting the JASO standards (F-106-74; Loosening and Tightening of Hexagon Nuts for Vehicle Use).

Concerning the higher and lower temperature resistance of the adhesive, it was found to be sufficiently usable between −50° C. and 120° C. The resistability to chemicals and weather was found to meet that of nylon.

As shown above, the self-locking agent is a liquid, but can be dried and used as a powdered self-locking agent melted on a heated screw surface creating a self-locking screw material. In this manner, using the powdered self-locking agent is very convenient. The adhesive molecules are dispersed in the powder and can sufficiently used as an adhesive with no leakage. Also because in this powdered self-locking agent there is no solvent contained, there is no fear of bubbles when heating. The strength when compared to the liquid adhesive is stronger. Moreover, this powdered self-locking agent, similar to the coating powdered self-locking agent described below adheres to the screw surface. Because the powdered self-locking agent of this example is dried and crushed, the particle has rough shape and the spreading on the screw surface is very simple. In other words, the solid powder can easily be applied and spread on the screw surface.

II. An Example of the Mechanical Mixing of the First and Second Materials.

The materials used for the first and second materials are the same as those used in example I. However, here the first material will be limited to a powder and the second material will be dissolved in the volatile solvent.

The methods for mixing the second material into the first material are; fluidized bed method, stirring method, and surface coating method. These particle coating methods are all possible, however the stirring method is very simple and probably the best.

In the fluidized bed method, the aforementioned nylon powder is maintained in a fluidized condition. To this the adhesive, diluted in the solvent, is sprayed, condensated and granulated producing the self-locking agent. To do this a simple device can be used in an airtight condition for a short period of time.

In the stirring method, as the powdered nylon is being stirred, the adhesive is added and the self-locking agent is produced. The efficiency of the self-locking agent produced by this method is very good. Also the produced self-locking agent is homogeneous and of good quality.

In the surface coating method, by using the same equipment that was used in the aforementioned fluidized bed method, the adhesive is coated onto the powdered nylon.

The solvent used for the adhesive may be acetone, methyl-ethyl-ketone or a ketone solvent, however it should not dissolve the nylon powder very much. If the adhesive is dissolved that is sufficient. Also, the solvent must contain an ingredient that will at least dissolve the main ingredient of the adhesive, the epoxy resin. For example, a solvent containing a hydrocarbon solvent, a chlorine solvent, an alcohol solvent may be used but it it not limited to those types alone.

The self-locking agent is obtained by using one of the aforementioned coating methods and coating the nylon powder with the adhesive, which is used to firmly bond or weld the nylon to the screw surface.

When this self-locking agent is heated and spread on at least one portion of the screw surface and is welded, a processed surface is produced by the adhesive the same as if a primer process was performed, and the nylon is firmly bonded to the screw surface.

As a pre-processing operation, a degreasing process using trichloroethylene, etc. should be sufficient. The screw material may be of iron, copper, brass, stainless steel, or other and may be plated with chrome, zinc, chromate, nickel, etc.

The method of forming the self-locking screw material which welds the powdered self-locking agent to the screw material will be explained.

FIG. 1 is a block diagram showing an example of the processing of the adhesive. Block 1 shows the application of heat to the screw material. The heat is applied by a high frequency heating or in a heating room. The temperature is 200° C. to 300° C. and must be determined by considering the nylon and adhesive properties.

Block 3 shows the spreading of the powdered self-locking agent to the heated screw material. The powdered self-locking agent is simultaneously or oderly spread on the screw material that is simultaneously or orderly taken out of the heater. An example of the spreading method is to sprinkle a proper amount of the powdered self-locking agent on the arranged screw material from the slit in the upper portion of the screw. Also arranging equipment to spray a proper amount of the self-locking agent through a nozzle scattering it in spots is allowable. Moreover, by turning the screw back-and-forth, proper amount of the powdered self-locking agent may be sprinkled by way of the slit in the top of the screw material and a linear protrusion may be formed around the entire screw material. The methods are not limited to those above only. It is also possible to use many of the methods used up until now for spreading.

Block 5 shows the completed self-locking screw after heat has been applied to the screw material and then has been cooled. In the process of this example of self-locking screw material, there is no primer processing as was done in former methods. Nevertheless, in the actual completed screw material a primer surface has been formed.

Figure 2:
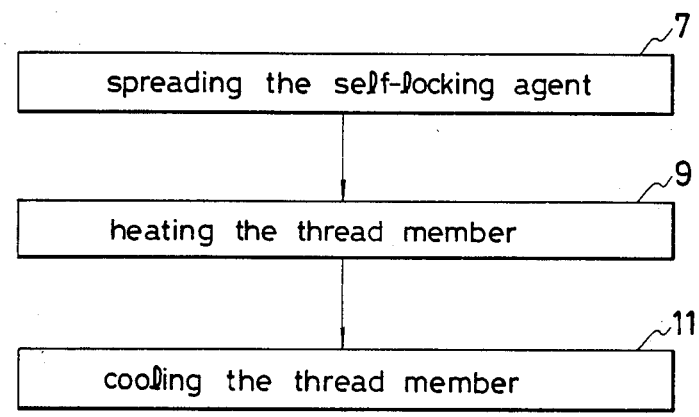

FIG. 2 is another block diagram showing the process for forming the self-locking screw material.

Block 7 shows the spreading process of the powdered self-locking adhesive to the screw material. In this case because the screw material is not yet heated, there is fear that after the powdered self-locking agent is spread it will separate from the screw material. In this case, a relatively inexpensive temporary fixing solvent is prepared. It is used to dampen the screw surface before spreading so that the powdered self-locking adhesive adheres to the screw surface. There should be no problems when the powdered self-locking agent is spread in spots.

Block 9 shows the heating process. Heating is performed at 200° C. to 300° C. but should be determined depending on the type of nylon used etc. Block 11 shows the cooling process and is the same as block 5 of FIG. 1.

Examples of the screw material are given in FIGS. 3 to 6.

Before giving application examples of this example (II), comparison tests that were performed are described.

The comparison tests are compared to a test which was performed using a self-locking agent using only 100 parts nylon 11 and performing an adhesive shear test and bolt test. These tests were performed for all of the application examples mentioned later. In the shear test a steel plate 25 mm × 10 mm × 1.6 mm was used and tests were performed on three locations (without primer). The results showed that the average shear strength was 215 kg/cm$^2$.

In the comparison bolt test nylon 11 was heat-welded to a Japan Industrial Standard (JIS) 2 class M8 bolt at 220° C. for 30 minutes. This bolt is then screwed into a nut and then unscrewed. This is performed over and over again to check if there was any separation of agent. The results showed that 2 out of 5 bolts tested had separation.

(EXAMPLE 1)

In the first application example a self-locking agent which is used as a coating in the stirring method is made of a mixture of 100 parts nylon 11, 5 parts epoxy, 3 parts isocyanate, and 100 parts MEK, and tested.

Examples of the isocyanate are those of tolylenediisocyanate group such

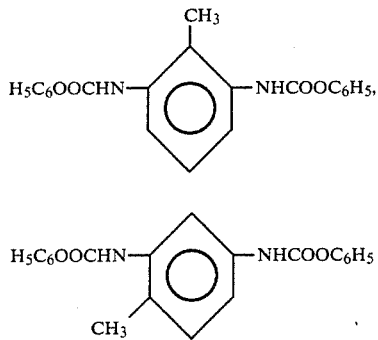

In the shear test of the first application example, under the same conditions as the comparison tests above, the shear strength was found to be 341 kg/cm$^2$. Also in the separation test, not any of the 5 bolts had separation. Of course no primer processing was used for the bolts.

(EXAMPLE 2)

In the second application example, a self-locking agent is made of a mixture of 100 parts nylon 11, 5 parts epoxy, 1 part silanecoupling agent and 100 parts MEK, and tested. In the shear test of the second application example, under the same conditions as the comparison test above, the shear strength was 306 kg/cm$^2$. In the separation test, as in the first example, not any of the 5 bolts had separation.

(EXAMPLE 3)

In the third application example a self-locking agent is made with 100 parts nylon 11, 5 parts epoxy, 3 parts phenol, and 100 parts MEK, and tested.

In the shear test of the third application example, the shear strength was 339 kg/cm$^2$, and in the separation test, separation was zero.

As can be seen from the application examples of the above comparison tests, the shear strength when compared to the adhesive of only nylon, there was a 50% improvement. Also in the separation test in the application examples of this invention, there was not even one bolt that had separation. Therefore, a self-locking agent was obtained that sufficiently displays its function.

In the above separation tests a torque wrench was applied to the aforementioned bolt and nut to measure the unscrewing resistance (kg.m) in the repetition test. The values as a comparison were taken on the first through fifth times and the average values were 30, 14, 10, 7, 4. In the first application example the values were 51, 25, 18, 14, 12. In the second application example the values were 47, 22, 15, 13, 10. In the third application example the values were 49, 20, 15, 14, 11.

Using the powdered self-locking agent of the previous example (I) a similar self-locking screw material to that shown in FIG. 1 and FIG. 2 can be produced, however the locking results were nearly the same as those obtained in the application examples of this example (II).

In summary, the self-locking agent of this invention does not require a primer process. By spreading it on a heated screw surface or heating and melting it after it has been applied to a non-heated screw surface, the screw surface of the screw material is the same or better than that when using a primer process in adhereing to the screw. The self-locking area can be formed to perform the function of self-locking or sealing.

The self-locking screw material that is formed from the self-locking agent makes a reliable self-lock or seal, and can be used in a wide variety of devices. For example, automobiles, motorcycles, bicycles, axles, home electrical appliances, home tools, communications devices, sewing machines, glasses, oil or air compressors, farm machinery, construction machinery, shipbuilding, packing devices, plumbing, and many other types of machinery.

What is claimed is:

1. A self-locking agent consisting essentially of a mixture of:
   (a) 100 parts by weight of a first material adhered to a screw surface to carry out a function of self-locking,
   said first material being selected from the group consisting of a polyamide and a copolyamide; and
   (b) a sufficient amount of a second material to have an adhesive ability in advance of fastening the screw to carry out a function of causing the first material to adhere to the screw surface, the amount of the first material being greater than that of the second material, said second material consisting essentially of a first adhesive agent comprising epoxy resin and a second adhesive agent selected from the group consisting of a phenol resin, isocyanate compound, titanate, silane coupling agent and an organic-silicon compound having an amino or oxirane base.

2. The self-locking agent of claim 1, wherein said first material is a polyamide or copolyamide, said mixture is made by dispersing said first material and said second material in a volatile solvent.

3. The self-locking agent according to claim 1, wherein said first material is nylon.

4. The self-locking agent mentioned in claim 2, wherein said second material is comprised of epoxy resin and phenol resin.

5. The self-locking agent mentioned in claim 2, wherein said second material is comprised of epoxy resin and an organic-silicone-compound which has an amino or oxirane base.

6. The self-locking agent mentioned in claim 2 said second material contains an amino resin.

7. The self-locking agent mentioned in claim 2, wherein the second material contains epoxy resin and titanate.

8. The self-locking agent according to claim 3, wherein said second material further including amino resin.

9. A self-locking agent according to claim 3, wherein said first material has a form of powder,
   a surface of a fine particle of the first-material powder being coated with said second material.

10. The self-locking agent according to claim 3 further comprising an amount of volatile solvent, wherein said first material and second material are dissolved in the volatile solvent.

11. A method of forming a self-locking agent mentioned in claim 9, comprising the following steps: dissolving an adhesive in a volatile solvent so as to form said second material, mechanically mixing the first and second material, and drying the resultant mixture so that the second material is used as a coating of the first material.

12. A method of producing a self-locking screw material by making use of the self-locking agent of claim 10, comprising the following steps:
(a) drying said self-locking agent to produce a solid self-locking agent;
(b) crushing the solid self-locking agent to form a powdered self-locking agent composed of fine particles coated with said second material;
(c) heating a screw material to such a high temperature that the self-locking agent can be welded; and
(d) spreading said powdered self-locking agent on said heated screw material.

13. A method of producing a self-locking screw material by making use of the self-locking agent of claim 10, comprising the following steps:
(a) drying said self-locking agent to produce a solid self-locking agent;
(b) crushing the solid self-locking agent to form a powdered self-locking agent composed of fine particles coated with said second material;
(c) spreading said powdered self-locking agent on a surface of a screw material; and
(d) heating the screw material to weld said powdered self-locking agent.

14. A method of producing a self-locking screw material by making use of the self-locking agent of claim 9, comprising the following steps:
(a) spreading said powdered self-locking agent on a screw surface;
(b) heating the screw material to weld the self-locking agent.

* * * * *